A. STUCKI.
ROLLER SIDE BEARING.
APPLICATION FILED APR. 21, 1913.
Reissued May 20, 1913.
13,567.
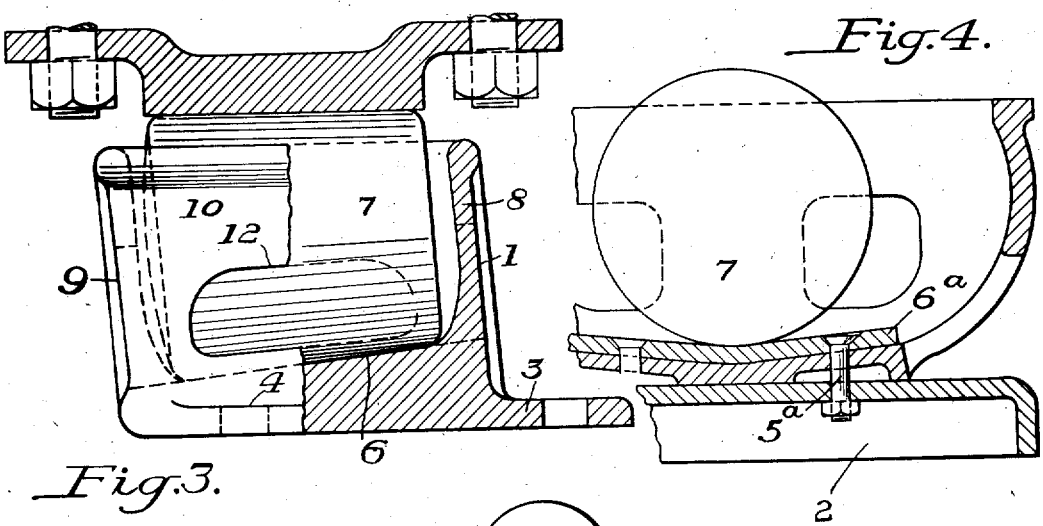
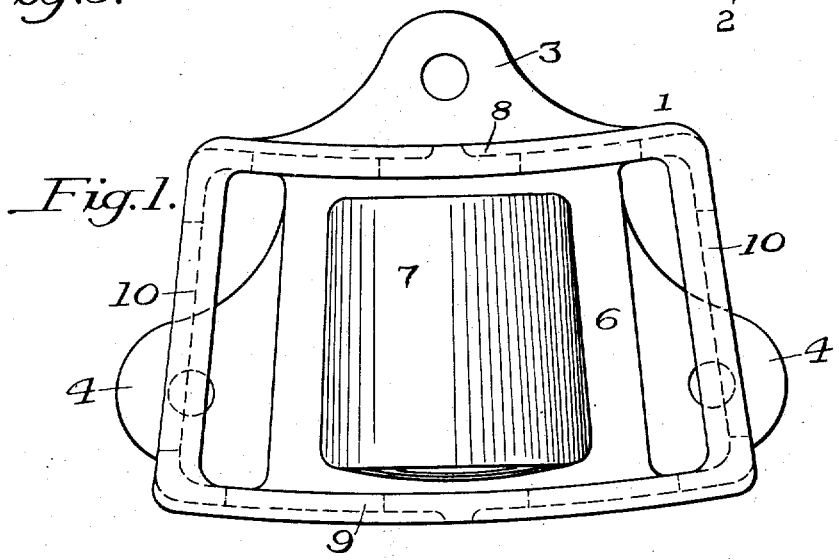
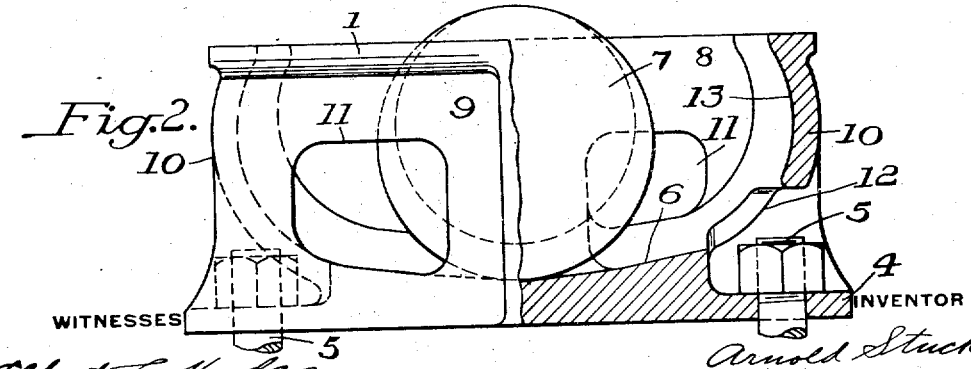
WITNESSES
Elbert L. Hyde
William P. Larkin
INVENTOR
Arnold Stucki
By Fredk H. Winter
Att'y.

UNITED STATES PATENT OFFICE.

ARNOLD STUCKI, OF PITTSBURGH, PENNSYLVANIA.

ROLLER SIDE BEARING.

13,567. Specification of Reissued Letters Patent. Reissued May 20, 1913.

Original No. 1,033,210, dated July 23, 1912, Serial No. 620,006. Application for reissue filed April 21, 1913. Serial No. 762,754.

*To all whom it may concern:*

Be it known that I, ARNOLD STUCKI, a resident of Pittsburgh, in the county of Allegheny and State of Pennsylvania, have invented a new and useful Improvement in Roller Side Bearings, of which the following is a specification.

This invention relates to side bearings for railway cars.

The object is to provide a bearing which is efficient and nearly frictionless and which performs all of the other necessary functions of side bearings, which is very simple and therefore inexpensive both as to first cost and subsequent repair, which is lasting in service, and which preferably travels radially and returns in a radial path to central position whenever the body bolster is raised.

The invention comprises a side bearing constructed and arranged as hereafter described and claimed.

In the accompanying drawing Figure 1 is a plan view of the bearing; Fig. 2 is in part a side view and in part a vertical section thereof; Fig. 3 is an end view thereof partly in section; and Fig. 4 is in part a side view and in part a vertical section showing a modification.

In the drawings the side bearing is shown adapted for a tapering truck bolster, but it can readily be adapted to a straight truck bolster and to receive either a straight or tapering body bolster.

The side bearing comprises a suitable frame or housing 1, having its lower face inclined to correspond to the taper of the bolster, which is indicated at 2. Obviously, when the bolster is formed of cast metal, such as cast steel or the like, the housing 1 will be made or cast integral or in one piece with the bolster, although this is not essential. The housing is provided with an inwardly projecting flange 3 and a pair of laterally projecting flanges 4, provided with holes for receiving bolts 5 or rivets for connecting the bearing to the bolster. The bottom of the housing forms a bearing surface 6, the outer and inner edges of which are shaped on an arc struck from the center plate or king pin as a center. Rolling on the bearing surface 6 is a conical roller 7 which is tapered to form a frustum of a cone whose apex is in the center of the center plate or king pin. The bearing surface 6 and roller 7 are preferably smooth and plain to reduce friction and wear. The bearing surface is of considerable width and the roller of considerable length, in order to afford sufficient resistance against the pounding action of the body bolster, which is considerable, since side bearings of this class frequently have a material amount of clearance. The roller is of very large diameter for such bearings so as to afford more than mere lines of contact and also to increase the bearing surface and reduce the rolling friction to a minimum. The conical shape of the roller particularly adapts it to travel without friction in the arc-shaped bearing surface, thereby avoiding all necessity of sliding, which would not only cause much friction but also flatten the roller. The housing is provided with suitable barriers, webs or walls, preferably of skeleton or open construction, to confine the roller and prevent it from jumping out of the housing under normal operating conditions. As shown, the housing has the upwardly projecting inside web or wall 8 and outside web or wall 9 and end closing walls or webs 10. The inside and outside webs or walls are provided with openings 11 extending down to the bearing surface 6 and the end walls or webs are also provided with openings 12 also extending down to the bearing surface 6, so that a pocket is avoided and any dirt which gets into the bearing will immediately pass out through one of these openings. The end walls or webs are so shaped as to form stops for the roller, preferably having their upper portions substantially vertical and curved as shown at 13 to the contour of the roller to provide a broad contacting stop for the roller. The side and end walls or webs extend upwardly materially above the center of the roller, thereby forming a deep cage from which the roller cannot escape in all normal conditions of use, and also enabling the openings 11 and 12 to be made very large to insure the escape of dirt. This construction forms practically a skeleton cage with the side and end barriers to restrain the roller supported from the base or bottom by six posts or columns. The inside and outside webs or walls 8 and 9 preferably flare outwardly or away from each other toward their upper edges, as shown in Fig. 3. The roller fits the space between these webs or walls quite closely, but on account of the flaring condition of the latter the ends of the roller can contact therewith only at the bottom, that is, near the bearing surface 6, which obviously is the point of rotation of a rolling body, thereby avoiding friction. Preferably the inner or smaller end of the roller is plain, as shown, and its outer end is somewhat convex. Hence, since the roller fits between the side walls or webs rather closely, should any external cause tend to give the roller an askew position, its flat inner end will hug the convex surface of the inner wall or web 8, while its convex outer end will hug the concave surface of the outer wall or web 9, so that no binding can occur and the roller has a tendency to resume its proper position, that is, with its axis pointing toward the king pin or center plate.

The bearing surface 6 curves or is inclined upwardly slightly from its center toward its ends, so that when the bolsters separate sufficiently to release the roller it rolls back to central position. This bearing surface may, if desired, be formed by a hardened steel plate inserted in the cast metal of the housing, as shown at 6[a], Fig. 4. This plate is shown secured to the housing by the bolts 5[a] which secure the housing to the bolster.

The bearing described is of very simple construction, avoids all pockets in which dirt can accumulate, is inexpensive both as to first cost and subsequent repair and is very lasting on account of the large and substantial character of its parts. It consists of only two parts, both of which are substantial. The roller is of sufficient size to practically overcome all friction in rolling, while the shape of the ends and of the inside and outside webs or skeleton walls of the housing prevent friction at the ends of the roller. The large size of the roller both as to diameter and length, makes the device nearly frictionless, as well as very lasting. The roller is perfectly free to travel in the housings under all changes of angular relation between the bolsters and will roll back to central position whenever the bolsters separate.

What I claim is:—

1. A side bearing for lower bolsters of railway cars comprising a housing having its bottom forming a bearing surface and provided with side and end walls or barriers, and a roller in said housing free to roll on said bearing surface, said side and end walls or barriers being connected to the bottom by posts or columns to provide on all sides large openings at the level of the bearing surface, said walls or barriers extending upwardly beyond the center of the roller, and the upper portions of the end walls being substantially vertical to prevent the escape of the roller.

2. A side bearing for lower bolsters of railway cars comprising a housing having its bottom forming a bearing surface inclining upwardly from its center toward its ends and provided with side and end walls or barriers, and a roller in said housing free to roll on said bearing surface, said side and end walls or barriers being connected to the bottom by posts or columns to provide on all sides large openings at the level of the bearing surface, said walls or barriers extending upwardly beyond the center of the roller and the upper portions of the end walls being substantially vertical to prevent the escape of the roller.

3. A side bearing for lower bolsters of railway cars comprising a housing having its bottom forming a bearing surface and provided with side and end walls or barriers, said side walls or barriers being arc-shaped, and a conical roller in said housing free to roll on said bearing surface, said side and end walls or barriers being connected to the bottom by posts or columns to provide on all sides large openings at the level of the bearing surface, said walls or barriers extending upwardly beyond the center of the roller and the upper portions of the end walls being substantially vertical to prevent the escape of the roller.

4. A side bearing for lower bolsters of railway cars comprising a housing having its bottom forming a bearing surface inclining upwardly from its center toward its ends and provided with side and end walls or barriers, said side walls or barriers being arc-shaped, and a conical roller in said housing free to roll on said bearing surface, said side and end walls or barriers being connected to the bottom by posts or columns to provide on all sides large openings at the level of the bearing surface, said walls or barriers extending upwardly beyond the center of the roller and the upper portions of the end walls being substantially vertical to prevent the escape of the roller.

5. A side bearing for lower bolsters of railway cars comprising a housing having its bottom forming a bearing surface and provided with side and end walls or barriers, and a roller in said housing free to roll on said bearing surface, said side and end walls or barriers being connected to the bottom by posts or columns and provided on all sides with large openings at the level of the bearing surface, said walls or barriers extending upwardly beyond the center of the roller, and the upper portions of the end walls being substantially vertical to prevent the escape of the roller, the side retaining walls or barriers flaring apart upwardly so that the roller ends contact at the bottom only.

In witness whereof I have hereunto set my hand.

ARNOLD STUCKI.

Witnesses:

WILLIAM B. WHARTON,

E. L. HYDE.